United States Patent
Ajitomi et al.

(10) Patent No.: US 9,258,137 B2
(45) Date of Patent: Feb. 9, 2016

(54) BRIDGE APPARATUS AND BRIDGE SYSTEM WITH A VIRTUAL DEVICE FOR PROTOCOL CONVERSION

(75) Inventors: Daisuke Ajitomi, Yokohama (JP);
Yoshiki Terashima, Kawasaki (JP);
Keiichi Teramoto, Kawasaki (JP);
Yasuhiro Morioka, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 473 days.

(21) Appl. No.: 12/898,124

(22) Filed: Oct. 5, 2010

(65) Prior Publication Data
US 2011/0026535 A1   Feb. 3, 2011

Related U.S. Application Data

(63) Continuation of application No. 11/563,082, filed on Nov. 24, 2006, now abandoned.

(30) Foreign Application Priority Data

Nov. 29, 2005   (JP) ................. 2005-343906

(51) Int. Cl.
*G06F 15/16*   (2006.01)
*G06F 15/173*   (2006.01)
*H04L 12/28*   (2006.01)
*H04L 12/46*   (2006.01)
*H04L 12/54*   (2013.01)
(Continued)

(52) U.S. Cl.
CPC ........ *H04L 12/2832* (2013.01); *H04L 12/4625* (2013.01); *H04L 12/54* (2013.01); *H04L 49/70* (2013.01); *H04L 67/14* (2013.01); *H04L 67/2842* (2013.01)

(58) Field of Classification Search
CPC . H04L 67/14; H04L 12/2832; H04L 12/4625; H04L 12/54; H04L 67/2842; H04L 49/70
USPC ........... 709/249, 223, 224, 226, 246; 370/401
See application file for complete search history.

(56) References Cited

U.S. PATENT DOCUMENTS 4,706,080 A * 11/1987 Sincoskie ..................... 370/401
4,706,081 A * 11/1987 Hart et al. ..................... 370/254
5,086,426 A    2/1992 Tsukakoshi et al.
(Continued)

FOREIGN PATENT DOCUMENTS

JP   2001-7861   1/2001
JP   2003-8610   1/2003
(Continued)

*Primary Examiner* — Daniel C Murray
(74) *Attorney, Agent, or Firm* — Oblon, McClelland, Maier & Neustadt, L.L.P.

(57) ABSTRACT

A bridge apparatus is disclosed, the bridge apparatus being connected between a first network and a second network and achieving a communication between equipment connected to the first network and equipment connected to the second network. This apparatus accepts communication from the equipment over the first network to equipment disconnected from the second network, and then, preserves contents of the communication even in the case where the equipment over the second network has been disconnected from the second network for reasons such as electric power cut. In the case where the disconnected equipment has been connected to the second network again, this apparatus transmits the accepted contents of the communication to the reconnected equipment.

11 Claims, 8 Drawing Sheets

(51) Int. Cl.
*H04L 12/931* (2013.01)
*H04L 29/08* (2006.01)

(56) References Cited

U.S. PATENT DOCUMENTS

| | | | | |
|---|---|---|---|---|
| 5,179,554 A * | 1/1993 | Lomicka et al. | | 370/257 |
| 5,329,618 A * | 7/1994 | Moati et al. | | 709/245 |
| 5,428,771 A * | 6/1995 | Daniels et al. | | 718/101 |
| 5,446,735 A * | 8/1995 | Tobagi et al. | | 370/445 |
| 5,515,513 A * | 5/1996 | Metzger et al. | | 709/249 |
| 5,884,043 A * | 3/1999 | Teplitsky | | 709/238 |
| 5,926,626 A * | 7/1999 | Takeuchi et al. | | 709/249 |
| 6,097,705 A * | 8/2000 | Ben-Michael et al. | | 370/315 |
| 6,098,100 A | 8/2000 | Wey et al. | | |
| 6,343,330 B1 * | 1/2002 | Khanna et al. | | 709/249 |
| 6,553,421 B1 * | 4/2003 | Frick et al. | | 709/227 |
| 6,674,756 B1 * | 1/2004 | Rao et al. | | 370/395.21 |
| 6,910,068 B2 * | 6/2005 | Zintel et al. | | 709/220 |
| 6,963,925 B1 * | 11/2005 | Ishikawa et al. | | 709/238 |
| 7,007,107 B1 * | 2/2006 | Ivchenko et al. | | 709/250 |
| 7,130,925 B2 * | 10/2006 | Noda et al. | | 709/249 |
| 7,142,128 B2 * | 11/2006 | Kobayashi | | 709/218 |
| 7,403,982 B2 * | 7/2008 | Tanaka et al. | | 709/220 |
| 7,492,704 B2 * | 2/2009 | Jain et al. | | 370/216 |
| 7,633,959 B2 * | 12/2009 | Ajitomi et al. | | 370/402 |
| 7,634,608 B2 * | 12/2009 | Droux et al. | | 710/306 |
| 7,650,323 B2 * | 1/2010 | Hesse | G05B 15/02 | 706/62 |
| 7,702,842 B2 * | 4/2010 | Noda et al. | | 710/315 |
| 7,742,486 B2 * | 6/2010 | Nielsen et al. | | 370/401 |
| 7,827,312 B2 * | 11/2010 | Ramaswamy et al. | | 709/246 |
| 7,852,860 B2 * | 12/2010 | Aizu et al. | | 370/401 |
| 7,882,256 B2 * | 2/2011 | Murakami et al. | | 709/230 |
| 7,912,928 B2 * | 3/2011 | Tanaka et al. | | 709/220 |
| 8,014,408 B2 * | 9/2011 | Habetha et al. | | 370/401 |
| 8,042,048 B2 * | 10/2011 | Wilson | H04L 12/2807 | 700/17 |
| 8,086,886 B2 * | 12/2011 | Schmidt et al. | | 713/323 |
| 8,214,532 B2 * | 7/2012 | Caspers et al. | | 709/249 |
| 8,327,048 B2 * | 12/2012 | Mao | | 710/58 |
| 8,341,261 B2 * | 12/2012 | Fuse et al. | | 709/224 |
| 8,341,497 B2 * | 12/2012 | Fukutomi et al. | | 714/766 |
| 8,504,921 B2 * | 8/2013 | Wilson | H04L 12/2807 | 348/552 |
| 9,077,558 B2 * | 7/2015 | Levy | H04L 12/4625 | |
| 2001/0010061 A1 * | 7/2001 | Matsumoto | | 709/249 |
| 2001/0047431 A1 * | 11/2001 | Eytchison | | 709/249 |
| 2001/0049721 A1 * | 12/2001 | Blair et al. | | 709/203 |
| 2002/0026250 A1 * | 2/2002 | Maeda et al. | | 709/249 |
| 2002/0033760 A1 * | 3/2002 | Kobayashi | | 340/825.52 |
| 2002/0052798 A1 * | 5/2002 | Nishikado et al. | | 705/26 |
| 2002/0138785 A1 * | 9/2002 | Hammond et al. | | 714/14 |
| 2003/0145117 A1 * | 7/2003 | Bhat | | 709/249 |
| 2003/0158956 A1 * | 8/2003 | Tanaka et al. | | 709/230 |
| 2003/0231621 A1 * | 12/2003 | Gubbi et al. | | 370/352 |
| 2004/0078450 A1 * | 4/2004 | Chen et al. | | 709/214 |
| 2004/0139210 A1 * | 7/2004 | Lee et al. | | 709/230 |
| 2004/0176877 A1 * | 9/2004 | Hesse | G05B 15/02 | 700/276 |
| 2004/0199671 A1 * | 10/2004 | Kaneko et al. | | 709/249 |
| 2004/0218591 A1 * | 11/2004 | Ogawa | H04L 12/4625 | 370/364 |
| 2005/0049726 A1 * | 3/2005 | Adamson | G05B 15/02 | 700/19 |
| 2005/0119767 A1 * | 6/2005 | Kiwimagi | G05B 19/042 | 700/19 |
| 2005/0193105 A1 | 9/2005 | Basham et al. | | |
| 2005/0198222 A1 | 9/2005 | Kohinata et al. | | |
| 2005/0273522 A1 * | 12/2005 | Kohler | | 709/250 |
| 2005/0288823 A1 * | 12/2005 | Hesse | G05B 15/02 | 700/276 |
| 2006/0052884 A1 * | 3/2006 | Staples | G05B 19/0426 | 700/83 |
| 2006/0155836 A1 * | 7/2006 | Chang et al. | | 709/223 |
| 2006/0195613 A1 * | 8/2006 | Aizu et al. | | 709/246 |
| 2006/0242325 A1 | 10/2006 | Ramaswamy et al. | | 709/246 |
| 2006/0294214 A1 | 12/2006 | Chou | | |
| 2007/0078959 A1 * | 4/2007 | Ye | | 709/223 |
| 2007/0112939 A1 * | 5/2007 | Wilson | H04L 12/2807 | 709/219 |
| 2007/0124440 A1 | 5/2007 | Maki | | |
| 2007/0168046 A1 * | 7/2007 | Misawa et al. | | 700/1 |
| 2008/0088408 A1 * | 4/2008 | Backman | | 340/2.23 |
| 2008/0225883 A1 * | 9/2008 | Tanaka et al. | | 370/463 |
| 2009/0063878 A1 * | 3/2009 | Schmidt et al. | | 713/310 |
| 2009/0105846 A1 * | 4/2009 | Hesse | G05B 15/02 | 700/1 |
| 2009/0164674 A1 * | 6/2009 | Noda et al. | | 710/30 |
| 2009/0327507 A1 * | 12/2009 | Douillet et al. | | 709/230 |
| 2010/0004763 A1 * | 1/2010 | Murakami et al. | | 700/83 |
| 2010/0174836 A1 * | 7/2010 | Mao | | 710/58 |
| 2011/0016231 A1 * | 1/2011 | Ramaswamy et al. | | 709/246 |
| 2012/0233266 A1 * | 9/2012 | Hassan et al. | | 709/206 |
| 2012/0262628 A1 * | 10/2012 | Wilson | H04L 12/2807 | 348/552 |
| 2012/0265872 A1 * | 10/2012 | Chilton | | 709/224 |
| 2012/0278542 A1 * | 11/2012 | Liu et al. | | 711/103 |
| 2014/0020033 A1 * | 1/2014 | Wilson | H04L 12/2807 | 725/80 |
| 2015/0153809 A1 * | 6/2015 | Suurballe | G06F 1/3203 | 713/320 |

FOREIGN PATENT DOCUMENTS

| | | |
|---|---|---|
| JP | 2004-253900 | 9/2004 |
| JP | 2005-182481 | 7/2005 |

* cited by examiner

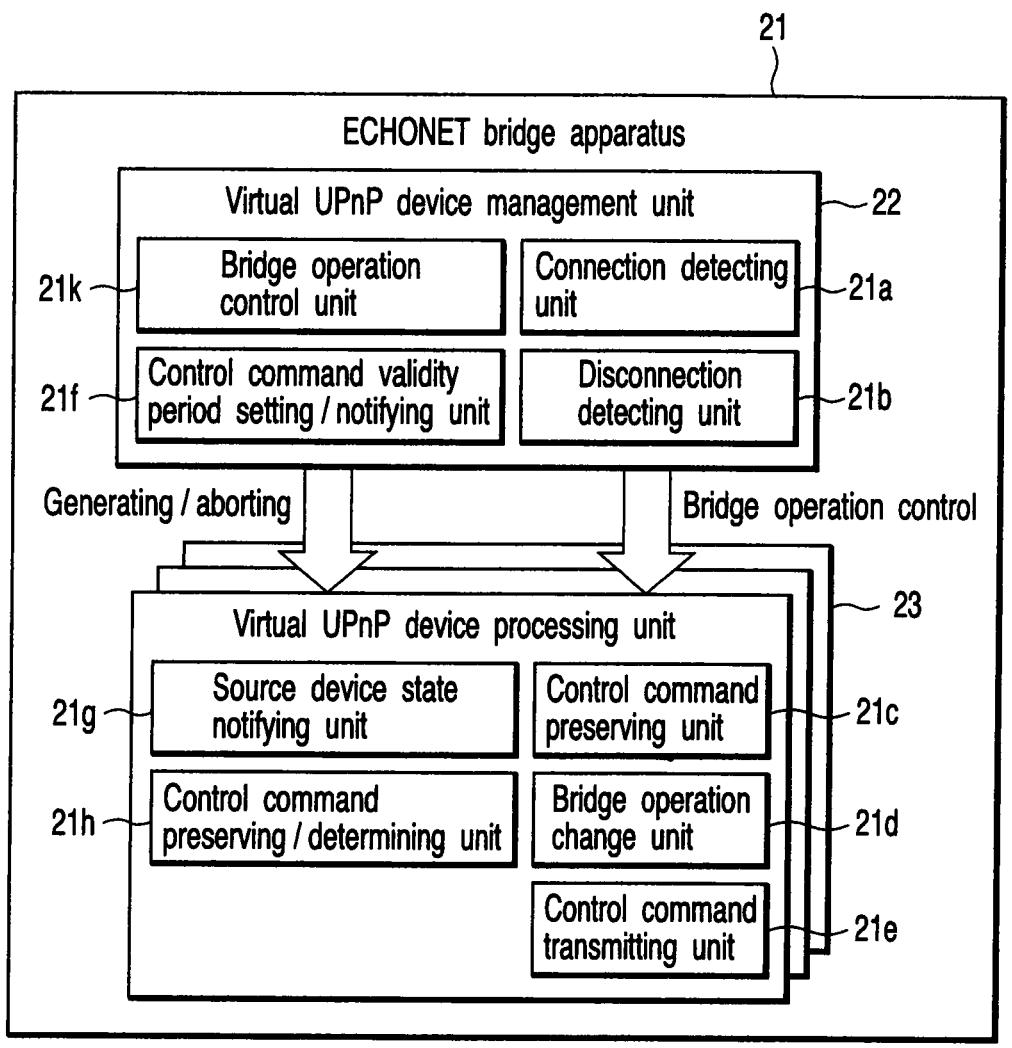
F I G. 2

| Contents of instruction | Detailed description |
|---|---|
| Current state of source device (90) | (on-line) Source device is established online<br>(off-line) Source device is established offline |
| Bridge processing period (seconds) (91) | (>0) Bridge processing operation is maintained<br>(=0) Bridge processing operation is stopped<br>(<0) Bridge processing operation is permanently maintained |
| Bridge processing operation type (92) | Discovery response enable / disable |
| | Description step enable / disable<br>·(In the case of disable) presence or absence of error response |
| | Control step enable / disable<br>·(In the case of disable) presence or absence of error response<br>·(In the case of enable) response policy of variable information on query response<br>Example) only information indicating off-line is returned<br>Example) final state information at the time of on-line is returned<br>·(In the case of enable) Cache of action request<br>·(In the case of enable) Maximum number of caches of action request<br>·(In the case of enable) Cache period of action request |
| | Eventing step enable / disable<br>·(In the case of disable) presence or absence of error response<br>·(In the case of enable) event notification policy<br>Example) event notification is transmitted when source device is established on-line<br>Example) no event notification is transmitted when source device is established off-line<br>·(In the case of enable) purchase period of event notification |

FIG. 3

| Description of attribute values | Attribute values | Variable / fixed |
|---|---|---|
| Power supply state | 0x80 | Variable |
| Manufacturer | 0x8a | Fixed |
| Manufacturer's serial number | 0x8d | Fixed |
| Model name | 0x8c | Fixed |

BRIDGE APPARATUS AND BRIDGE SYSTEM WITH A VIRTUAL DEVICE FOR PROTOCOL CONVERSION

CROSS-REFERENCE TO RELATED APPLICATIONS

This application is a Continuation Application of U.S. application Ser. No. 11/563,082, filed Nov. 24, 2006, which is based upon and claims the benefit of priority from prior Japanese Patent Application No. 2005-343906, filed Nov. 29, 2005, the entire contents of each of which are incorporated herein by reference.

BACKGROUND OF THE INVENTION

1. Field of the Invention

The present invention relates to a bridge apparatus and a bridge system.

2. Description of the Related Art

Home networking at general home has been progressed with rapid prevalence of personal computers and broadband systems. Up to now, a primary object of a home network has been limited to connection between a personal computer and peripheral devices such as a broadband router or a printer. In recent years, white goods and AV equipment as well as a personal computer have been equipped with network connection functions, and become constituent elements of a home network. Digital home electronics having this communication function, called information home electronics, provide a new function to a user by making connection to the Internet or providing an access to another equipment.

However, at present, transparent interconnection between these items of equipment (a personal computer and its peripheral devices, white goods, or AV equipment) configuring a home network is not achieved. This problem is caused by the fact that a control protocol for interconnecting personal computers and information home electronics with each other is not commonly shared. Currently, a plurality of control protocols coexist over a home network. The control protocols targeted for use in a home network can include AV/C utilized on a high speed IEEE1394 serial bus and ECHONET (registered trademark) available over a variety of communication networks.

UPnP is provided as an internationally standardized protocol whose main purpose is to interconnect personal computers and their peripheral devices or network devices such as routers, and utilizes a TCP/IP network constructed over Institute of Electrical and Electronics (IEEE) network 802. At present, its target is extended to AV equipment, and its standardization is in progress.

The high speed IEEE1394 bus network is targeted for use in AV equipment, and AV/C utilized over this network is a protocol standard for transmitting and receiving control commands of the AV equipment.

ECHONET is provided as a Japanese standard for control protocols targeted for use in white goods, sensors, and facilities. ECHONET is assumed to be used over a variety of communication networks such as IEEE802, Bluetooth (registered trademark), an infrared system, an electric line, and low power radio.

The UPnP, AV/C, and ECHONET are provided as incompatible, independent protocol standards, and an available communication network is different for each standard except that both UPnP and ECHONET operate over the IEEE802 network. Therefore, equipment conforming to one control protocol cannot control equipment conforming to another protocol. For example, a personal computer conforming to UPnP cannot control an air conditioner conforming to ECHONET or a video recorder conforming to an AV/C protocol.

A bridge apparatus solves this problem and enables equipment conforming to one protocol to control equipment conforming to another protocol. The bridge apparatus is interposed in a network used by both protocols, and converts one protocol to another protocol. At this time, in the case where one protocol has a mechanism for searching and disclosing equipment information and information on functions provided in the equipment, it is a problem how items of information of equipment belonging to another protocol are disclosed to the former protocol. A variety of solutions to this problem have been proposed. For example, in JP-A 2003-8610 (KOKAI), there is described a technique of making IEEE1394 equipment operable using an UPnP protocol by converting an AV/C command utilized over an IEEE1394 packet or the IEEE1394 network into a simple object access protocol (SOAP) message. In this document, there has been proposed a solution as to how functions provided in the IEEE1394 equipment are expressed as the UPnP equipment functions. Basically, this solution is featured in that the IEEE1394 equipment is virtually seen as UPnP equipment (hereinafter, referred to as a virtual UPnP) on a bridge apparatus.

However, this document fails to mention a problem occurring in the case where the IEEE1394 equipment targeted for use in bridging (hereinafter, referred to as a "source device") is powered OFF or in the case where an IEEE1394 cable is disconnected and no access can be provided to the source device via the IEEE1394 network. In the case where a bridge apparatus cannot access the source device via the IEEE1394 network, an UPnP control point over the UPnP network to which a bridge has been connected cannot access the source device, either. Current home electronics equipment with advanced low power consumption automatically moves to a suspended state if a user does not operate for a predetermined period of time. Thus, an access through a network via the bridge apparatus is limited to a limited period after the user has physically operated the source device.

This feature is particularly significant in white goods. In washing machines or microwaves, when washing or cooking is completed by a user's operation, power is usually turned off immediately. Although an advantage of operating home electronics equipment by utilizing a network is that an access can be provided anytime and anywhere, this advantage cannot be utilized by an energy saving mechanism of the source device.

In addition, a general problem occurring regardless of whether or not a gateway is interposed is that an UPnP control point cannot send a control command unless an UPnP device targeted for control is communicable. Thus, the UPnP control point needs to take an implementation mode for sending a control command after it has been determined whether communication with the target is enabled or disabled. As described previously, in the case where home electronics equipment frequently moves to a power saving mode, disabling communication, there is a possibility that an amount of time during which control can be achieved from the UPnP control point via a network is very small.

The bridge apparatus disclosed in the above document does not consider support for home electronics equipment with a power saving mode that frequently moves to a suspended state, and thus, an access can be provided via the bridge apparatus, namely, via a network for only a predetermined period limited after the user has operated the source device via a physical interface. Essentially, the bridge apparatus disclosed in the above document is targeted for use in AV equipment based on the IEEE1394, not for white goods (ECHONET compatible equipment) that often automatically move to such a suspended state.

BRIEF SUMMARY OF THE INVENTION

According to one aspect of the present invention, there is provided a bridge apparatus connected between a first network to which first equipment is connected and a second network to which second equipment is connected, the apparatus comprising: a connection detecting device configured to detect connection of the second equipment to the second network; a management device configured to allocate a virtual device processor to the second equipment in accordance with detection of the connection of the second equipment to the second network, wherein the virtual device processor makes a bridge operation between the first network and the second network; a disconnection detecting device configured to detect disconnection of the second equipment from the second network; and a bridge operation control device configured to direct the virtual device processor to change contents of the bridge operation in accordance with detection of the disconnection of the second equipment from the second network.

BRIEF DESCRIPTION OF THE SEVERAL VIEWS OF THE DRAWING

FIG. 2 is a block diagram depicting a bridge apparatus;

FIG. 3 is a view showing a list of control contents of a bridge operation control unit;

DETAILED DESCRIPTION OF THE INVENTION

First Embodiment

Figure 1:
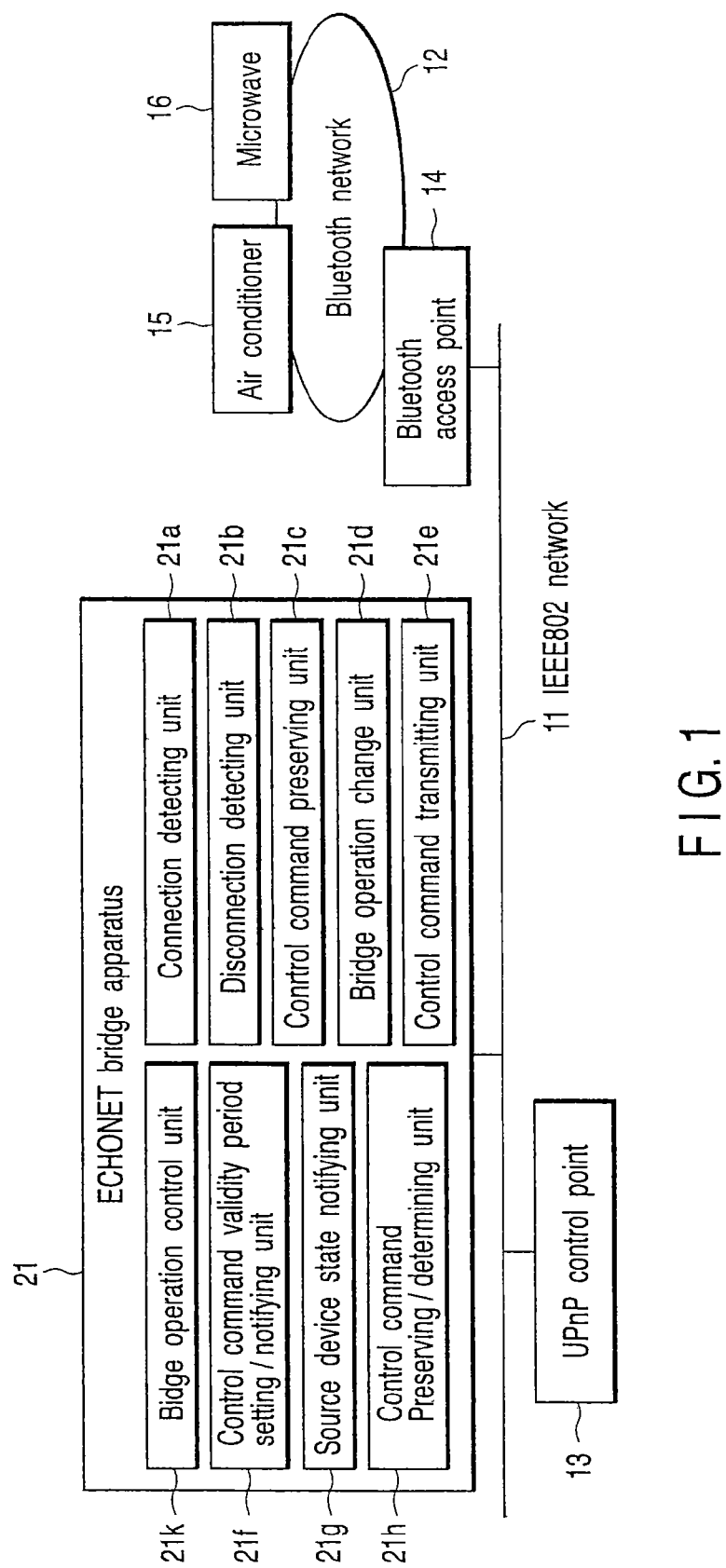
FIG. 1 is a view showing a network according to a first embodiment.

Referring to FIG. 1, an UPnP control point 13 exists over an IEEE802 network 11, and an air conditioner 15 and a microwave 16 compatible with an ECHONET protocol are connected to a Bluetooth network 12. In addition, a Bluetooth access point 14 is connected to both of the IEEE802 network 11 and the Bluetooth network 12. An ECHONET bridge apparatus 21 according to a first embodiment is connected to the IEEE802 network 11. The ECHONET bridge apparatus 21 includes: a connection detecting unit 21a, a disconnection detecting unit 21b; a control command preserving unit 21c; a bridge operation change unit 21d; a control command transmitting unit 21e; a source device state notifying unit 21g; a control command validity period setting/notifying unit 21f; a control command preserving/determining unit 21h; and a bridge processing content control unit 21k.

As shown in FIG. 2, the ECHONET bridge apparatus 21 is divided into a virtual UPnP device management unit 22 and a virtual UPnP device processing unit 23 in detail. Among the above-described units, the connection detecting unit 21a; the disconnection detecting unit 21b; the control command validity period setting/notifying unit 21f; and the bridge operation control unit 21k belong to the inside of the virtual UPnP device management unit 22, while the control command preserving unit 21c; the bridge operation change unit 21d; the control command transmitting unit 21e; and the source device state notifying unit 21f; and the control command preserving/determining unit 21h belong to the inside of the virtual UPnP device processing unit 23.

The virtual UPnP device management unit 22 allocates the virtual UPnP device processing unit 23 to ECHONET equipment. Specifically, this management unit is responsible for generating and aborting a process of an arbitrary number of the virtual UPnP device processing units 23 compatible with the ECHONET equipment. Further, the virtual UPnP device management unit 22 is responsible for controlling a behavior of the virtual UPnP device processing unit 23.

The virtual UPnP device processing unit 23 specifically is provided as a process associated with the ECHONET equipment on a one-to-one basis, and can exist in plurality in a single bridge apparatus. In the case of FIG. 1, two virtual UPnP device processing units 23 allocated to an air conditioner and a microwave exist in the bridge apparatus 21. One of the main functions of the virtual UPnP device processing unit 23 is to disclose the ECHONET equipment having allocated the virtual UPnP device processing unit 23 thereto as UPnP equipment (device) over the IEEE802 network. Upon receiving a control command from an UPnP control point, the UPnP device converts that command into an ECHONET protocol, and then, transmits the thus converted command to the associated ECHONET equipment. In addition, upon receiving a processing result or state notification from the ECHONET equipment, the UPnP device converts the contents of the notification to an UPnP protocol, and then, transmits the protocol to the UPnP control point.

Now, a description will be given with respect to an operation sequence of an ECHONET bridge apparatus 21 shown in FIG. 1.

The connection detecting unit 21a in the ECHONET bridge apparatus 21 detects home electronics equipment over the Bluetooth network 12. For example, the connection detecting unit 21a receives a broadcast packet of the ECHONET to be transmitted when the air conditioner 15 is connected to the Bluetooth network 12, and then, detects that the air conditioner 15 has been connected to the Bluetooth network 12. The ECHONET bridge apparatus 21 starts a bridge processing operation for the air conditioner 15 when connection with the air conditioner 15 is detected. Namely, the virtual UPnP device management unit 22 in the ECHONET bridge apparatus 21 generates the virtual UPnP device processing unit 23 while the air conditioner 15 is handled as a source device. As a result, from the UPnP control point 13, the air conditioner 15 is recognized as an UPnP device, and a control possible in accordance with the ECHONET protocol can also be made from the UPnP control point similarly. At this time, the ECHONET bridge apparatus 21 converts an UPnP protocol based control command received from the UPnP control point to an ECHONET protocol based control command, and then, transmits the converted control command to the source device (air conditioner 15), thereby achieving control of the air conditioner 15 from the control point 13. Here, a method for mapping the ECHONET equipment to UPnP is based on a method described in JP-A 2003-8610 (KOKAI) described above, for example.

On the other hand, the disconnection detecting unit 21*b* in the ECHONET bridge apparatus 21 detects disconnection of home electronics equipment from the Bluetooth network 12. For example, in the case where a power supply plug of the air conditioner 15 is pulled out, the disconnection detecting unit 21*b* detects that the air conditioner 15 has been disconnected from the Bluetooth network 12 by the fact that, after an ECHONET packet has been continuously periodically transmitted to the air conditioner 15, no response to this packet is made.

At this time, the virtual UPnP device management unit 22 of the ECHONET bridge apparatus 21 assigns an instruction to the bridge operation change unit 21*d* of the virtual UPnP device processing unit 23 compatible with the air conditioner 15 so as to maintain a bridge processing operation through the bridge operation control change unit 21*k*. As shown in FIG. 3, the contents of this instruction are composed of information relating to a source device current state 90, a bridge processing operation period 91, and a bridge processing operation type 92 with respect to the source device.

The source device current state 90 is provided as an indicator indicating online or offline. In this case, it is indicated that the air conditioner 15 is offline.

The bridge processing operation period 91 indicates a time for the virtual UPnP device processing unit 23 to maintain a bridge processing operation. In the case where 0 has been specified, a bridge processing operation is terminated immediately. Here, it is supported that a bridge processing operation relevant to the air conditioner 15 is to be maintained. Thus, a value such as 36000 seconds (10 hours), for example, greater than 0, is set.

The bridge processing operation type 92 indicates a protocol type to be processed by the virtual UPnP device processing unit 23 and the contents of detailed settings of a processing operation according to that protocol type. The protocol types to be processed indicate, for example, a response to a search from an UPnP control point by SSDP discovery; availability of periodic transmission of SSDP alive (i.e., whether or not to support an UPnP Discovery step); availability of acquisition of description by HTTP GET from an UPnP control point (whether or not to support an UPnP Description step); availability of a response to an action query request by an HTTP SOAP message (whether or not to support an UPnP Control step); availability of event notification by a GENA packet (whether or not to support an UPnP Eventing step).

In the case where UPnP Discovery is not supported, no response is made to an SSDP Discovery packet. In addition, in the case where UPnP Description is not supported, no response is made to a description request or an HTTP error response is returned.

In the case where UPnP Control is not supported, no response is made to an action query request or an HTTP error response is returned. On the other hand, in the case where UPnP Control is supported, for example, the following contents are specified as further detailed parameters:

Whether or not to respond to a query request relevant to an equipment static parameter (permanent information such as model name or device name);

Whether or not to respond to a query request relevant to a device variable parameter (such as air volume setting of an air conditioner, operating mode, temperature setting or room temperature). Response policy in the case where a response is made (such as whether or not to indicate offline or whether or not to return a value acquired during online); and Whether or not to cache an equipment action (control) request. Maximum value of cache number in the case where the request is cached, a cache maintaining time, and response policy to action request.

In addition, in the case where UPnP Eventing is not supported, no response is made to a GENA event purchase request or an error response is returned. In the case where UPnP Eventing is supported, as is the case with Control, an event notification policy (such as whether or not an event is notified when online is established again) and an event purchase period is specified as additional parameters.

In the present embodiment, this bridge processing operation type 92 specifies, for example, UPnP Discovery support enable; Description support enable; Control support enable (query response enable for permanent and variable parameters, action response enable, action cache enable, maximum cache number 3; cache period 3600 seconds), and Eventing support enable.

Subsequently, upon receiving the contents of the above instruction, the bridge operation change unit 21*d* changes an operation of the virtual UPnP device processing unit 23. That is, upon receiving an action request from the UPnP control point 13 without stopping the virtual UPnP device processing unit 23 (operation maintaining period 36000 seconds), the bridge operation change unit 21*d* does not forward that request message to the air conditioner 15, and then, caches up to three messages internally by means of the control command preserving unit 21*c* (validity period 3600 seconds). As a result of change in the bridge operation, from the UPnP control unit 13, the air conditioner 15 disconnected from the Bluetooth network 12 can be seen as an UPnP device and accessible equipment. A schematic view of the bridge operation change unit 21*d* is shown in FIG. 4.

Figures 4, 5:
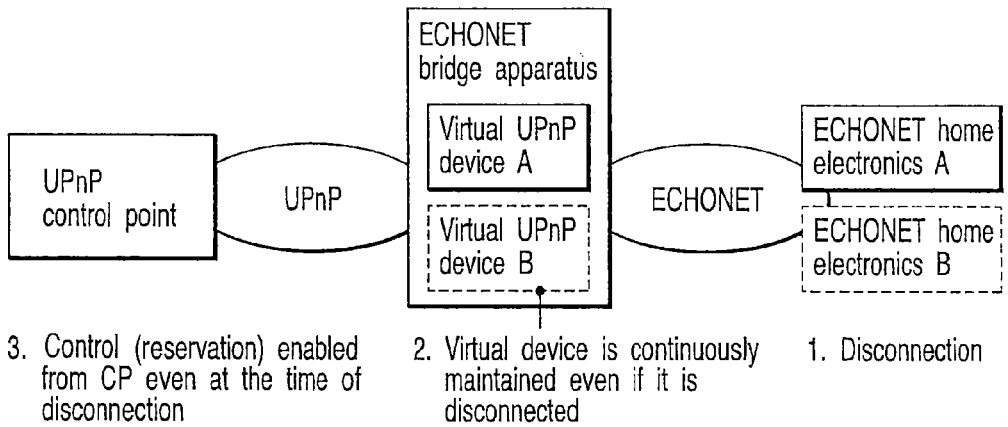
FIG. 4 is a schematic view showing a bridge processing operation according to the first embodiment.
FIG. 5 is a view showing a correlation table of attribute values of home electronics equipment and variable/fixed flags.

As shown in FIG. 4, the bridge operation change unit 21*d* can change an operation of the virtual UPnP device processing unit 23 by operations 1, 2, and 3 shown in FIG. 4 of (1) Disconnection, (2) Virtual devices continuously maintained even if it is disconnected, and (3) Control (reservations) enabled from CP even at the time of disconnection.

Subsequently, when a control command for turning ON the power of the air conditioner 15 is transmitted from the UPnP control point 13, the ECHONET bridge apparatus 21 receives that control command, and then, stores the received command inside the bridge apparatus by means of the control command preserving unit 21*c*. Here, when a power supply plug of the air conditioner 15 is inserted into an outlet, and then, the air conditioner 15 is connected to the Bluetooth network 12 again, the ECHONET bridge apparatus 21 recognizes that the air conditioner 15 is established online by means of the connection detecting unit 21*a*, and then, starts a bridge processing operation. At this time, in the ECHONET bridge apparatus 21, the control command transmitting unit 21*e* transmits to the air conditioner 15 the control command for turning ON the power transmitted from the UPnP control point 13 and stored in the control command preserving unit 21*c*. In this manner, the air conditioner 15 starts operation in accordance with the control command for turning ON the power. As described above, even if the main power supply of the air conditioner is turned OFF and no connection to the Bluetooth network is established, an air conditioner operation from the UPnP network is accepted in the ECHONET bridge apparatus 21. When the air conditioner has been reconnected, that air conditioner operation command can be executed immediately.

Now, an example in which a microwave 16 is targeted for control will be described here. Recently, network compatible microwaves have been produced. These microwaves enable complicated heating/cooking to be carried out by acquiring cooking recipe data via the Internet. However, many of these microwaves are powered down immediately for electric power saving at a time other than cooking. Power is turned ON while the user's opening of door of the microwave or operation of a user interface is handled as a trigger. Therefore, such microwaves are powered OFF in many cases, an access via a network cannot be provided, and recipe data cannot be transmitted. Namely, in the case where an attempt is made to transmit recipe data to a microwave via the Internet, power must be turned ON by physically operating the microwave (by opening a door or pressing a button on an operation panel). At this time, it becomes possible to transmit recipe data without worrying about a power supply state of a microwave by utilizing the ECHONET bridge apparatus 21 according to the first embodiment.

The ECHONET bridge apparatus 21 recognizes by means of the connection detecting unit 21a that the microwave 16 has been connected to the Bluetooth network 12. Here, while the ECHONET bridge 21 starts a bridge processing operation for the microwave 16, the power supply of the microwave 16 is turned OFF because of its electric power saving function, and an access cannot be provided via a network. While the ECHONET bridge apparatus 21 recognizes the fact by means of the disconnection detecting unit 21b, the bridge operation control unit 21k assigns the contents of an instruction similar to an example of the air conditioner 15 to the bridge operation change unit 21d, whereby a bridge processing operation does not stop. Thus, from the UPnP control point 13, the microwave 16 can be seen as an UPnP device, i.e., always accessible equipment. Here, the UPnP control point 13 transmits to the microwave 16 the cooking recipe data acquired via the Internet. The ECHONET bridge apparatus 21 receives the cooking recipe data, and stores the received data in the bridge apparatus by means of the control command preserving unit 21c. When the door of the microwave 16 is opened (to place a cooking material), and then, the microwave 16 is connected to the Bluetooth network 12 again, the ECHONET bridge apparatus 21 recognizes that the microwave 16 is established online by means of the connection detecting unit 21a, and then, starts a bridge processing operation. At this time, the ECHONET bridge apparatus 21 transmits to the microwave 16 the cooking recipe data transmitted from the UPnP control point 13 and stored therein by means of the control command preserving unit 21c, and then, sets a cooking mode based on the recipe data. As described above, the cooking recipe can be set for the microwave without worrying about a power supply state.

The bridge operation change unit 21d that the ECHONET bridge apparatus 21 includes, in detail, sets an operation of the virtual UPnP device processing unit 23 so as to maintain a support for a Discovery step for a predetermined period after a source device has been established offline, based on the contents of an instruction from the bridge operation control unit 21k. In this manner, in response to an equipment search message from the UPnP control point 13, the virtual UPnP device processing unit 23 transmits a response message regardless of a communication state of the ECHONET equipment and periodically transmits an SSDP alive message. Therefore, the source device (air conditioner 15 or microwave 16) can be caused to continuously exist as an UPnP device in the IEEE802 network 11.

In addition, the bridge operation change unit 21d that the ECHONET bridge apparatus 21 includes sets an operation of the virtual UPnP device processing unit 23 so as to maintain a support for a Description step for a predetermined period after the source device has been established offline, based on the contents of an instruction from the bridge operation control unit 21k in response to a description acquisition message from the UPnP control point. In this manner, regardless of a communication state of the ECHONET equipment, the virtual UPnP device responds a cached device/service description. Therefore, even in a state in which the source device (air conditioner 15 or microwave 16) is disconnected from a network, detailed information on the corresponding UPnP device can be continuously provided to the UPnP control point.

Further, the bridge operation change unit 21d that the ECHONET bridge apparatus 21 includes sets an operation of the virtual UPnP device processing unit 23 so as to maintain a support for an Eventing step for a predetermined period after the source device has been established offline, based on the contents of an instruction from the bridge operation control unit 21k. In this manner, this bridge operation change unit transmits a response for accepting a purchase request in response to an event purchase request message from the UPnP control point 13 regardless of a communication state of the ECHONET equipment, and then, responds the contents of a service description cached in the virtual UPnP device with respect to a first immediate event notification. After the source device has become communicable, in the case where an event notification occurs, a virtual device transmits an event notification to the UPnP control point 13 as usual.

Further, the bridge operation change unit 21d that the ECHONET bridge apparatus 21 includes sets an operation of the virtual UPnP device processing unit 23 so as to maintain a support for a Control step for a predetermined period after the source device has been established offline, based on the contents of an instruction from the bridge operation control unit 21k. In this manner, in response to an action query request from the UPnP control point 13, this bridge operation change unit can operate a behavior as to whether or not to respond to a query request, whether or not to respond to an action request, or whether or not to cache an action request message regardless of a communication state of the ECHONET equipment. At this time, in the case of caching the action request message, after the source device has been established online again, this bridge operation change unit can complete a processing operation after forwarding the action request to the source device. At this time, the bridge operation change unit 21d can achieve an operation of the virtual UPnP device processing unit 23 described previously by sending a proper instruction to the control command preserving unit 21c, the source device state notifying unit 21g, and the control command validity period setting/notifying unit 21f.

The control command preserving unit 21c that the ECHONET bridge apparatus 21 includes, in detail, responds fixed information to the UPnP control point instead of the ECHONET equipment being disconnected from the Bluetooth network, and doe not preserve a control command if the control command contains query about static information on the ECHONET equipment. A function of judging whether or not the control contents are query to fixed information on the ECHONET equipment is achieved by means of the control command preserving/determining unit 21h that the ECHONET bridge apparatus 21 includes.

The control command preserving/determining unit 21h is achieved by preserving a table in which a flag indicating whether or not each property is a permanent value has been added to a property map (list of attribute information on equipment that can be set/acquired) of the corresponding ECHONET equipment, and then, referring to the table. FIG. 5 shows an example of a correlation table of attribute value of home electronics equipment and a variable/fixed flag.

Figure 6:
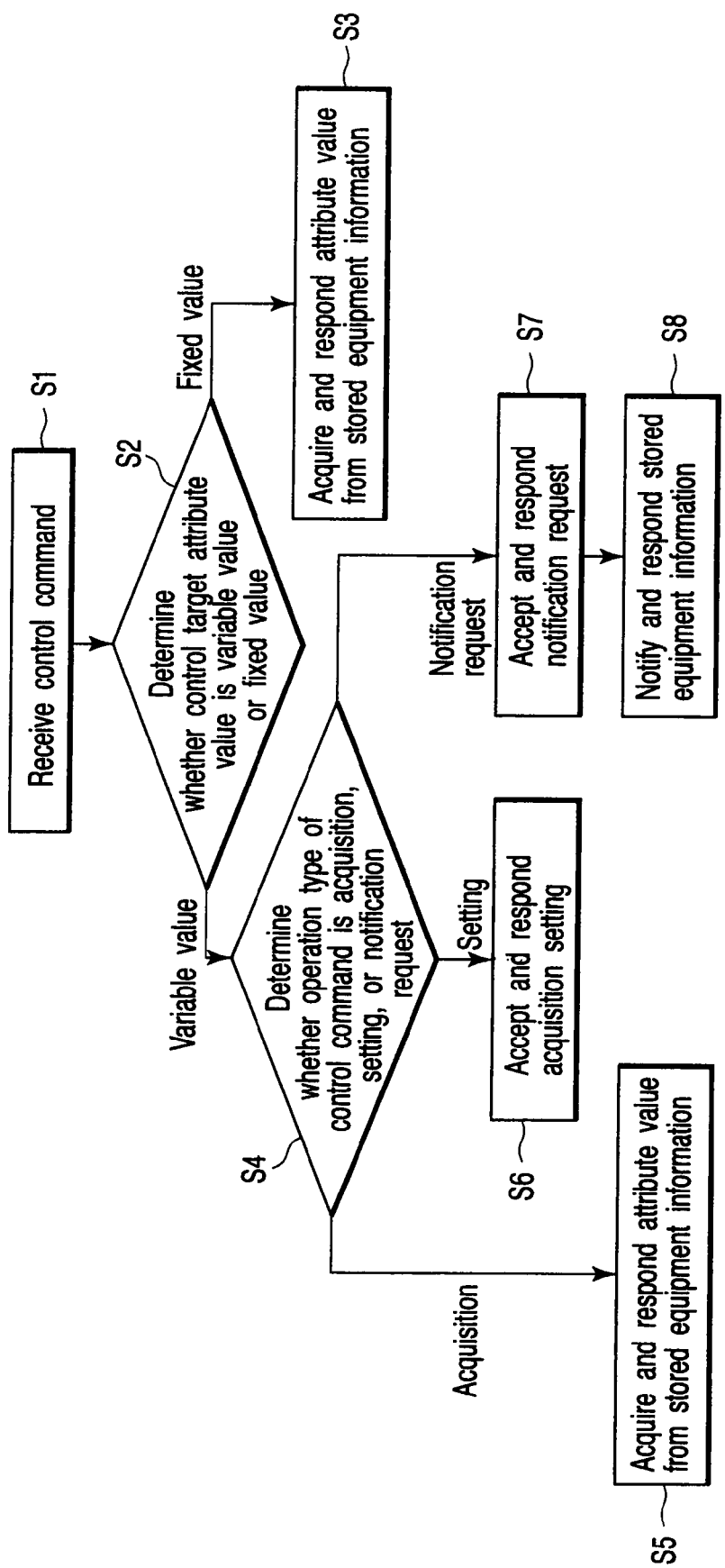
FIG. 6 is a flow chart showing procedures for basic processing operations of a control command preserving/determining unit.

FIG. 6 is a flow chart showing procedures for basic processing operation using the control command preserving/determining unit 21h. In step S1, when a control command is received, it is determined whether or not an attribute value of a control target is a variable value or a fixed value with respect to this control command (step S2). If the attribute value of the control target is a "fixed value", the attribute value is acquired from the preserved equipment information, and then, the acquired attribute value is responded (step S3). On the other hand, if the attribute value of the control target is a "variable value", it is determined whether or not an operation type of a control command is any one of "acquisition", "setting", and "notification request" (step S4). If the operation type of the control command is "acquisition", the attribute value is acquired from the preserved equipment information, and then, the acquired attribute value is responded (step S5). If the operation type of the control command is "setting", a response for accepting acquisition/setting is made (step S6). If the operation type of the control command is "notification request", a response for accepting a notification request is made (step S7), and then, the preserved equipment information is notified and responded (step S8).

If the control command contains setting a property value to the ECHONET equipment (for example, turning ON power supply of the air conditioner 15 or changing a set temperature of the air conditioner 15), the control command preserving unit 21c that the ECHONET bridge apparatus 21 includes, in detail, responds a successful processing operation to the UPnP control point 13 serving as a control command transmission source regardless of a power supply state of the source device.

In the present embodiment, regardless of whether a power supply state of the source device (air conditioner 15 or microwave 16) is turned ON or OFF, the ECHONET bridge apparatus 21 does not stop an operation of the virtual UPnP device processing unit 23 that corresponds to the respective source devices. Thus, from the UPnP control point 13 over the IEEE802 network 11, the air conditioner 15 or the microwave 16 is seen as if the power supply is always turned ON, and a mismatch occurs with an actual source device. However, according to the source device state notifying unit 21g that the ECHONET bridge apparatus 21 includes, the UPnP control point can know an actual power supply state of the source device or an elapsed time after power has been turned OFF.

The source device state notifying unit 21g in the ECHONET bridge apparatus 21 is achieved by the ECHONET bridge apparatus 21 defining variables indicating an actual power supply state of the source device or an elapsed time after power has been turned OFF and an action for acquiring these variables for a service description document of the virtual UPnP device that corresponds to the air conditioner 15 or the microwave 16, and disclosing the defined variables to the IEEE802 network 12.

Further, by means of the control command validity period setting/notifying unit 21f that the ECHONET bridge apparatus 21 includes, the UPnP control point can set and acquire the validity period of a control command in the case where the control command transmitted to the source device is stored by means of the control command preserving unit 21c of the ECHONET bridge apparatus 21.

The control command validity period setting/notifying unit 21f in the ECHONET bridge apparatus 21 is achieved by the ECHONET bridge apparatus 21 defining variables indicating the validity period of a control command for a source device and an action for acquiring/setting these variables in a service description document of the virtual UPnP device that corresponds to the air conditioner 15 or the microwave 16 and disclosing the defined variables to the IEEE802 network 12. In this manner, it is possible to avoid a situation in which the control command preserved in the ECHONET bridge apparatus 21 continuously consumes internal resources over a long period.

Second Embodiment

Figure 7:
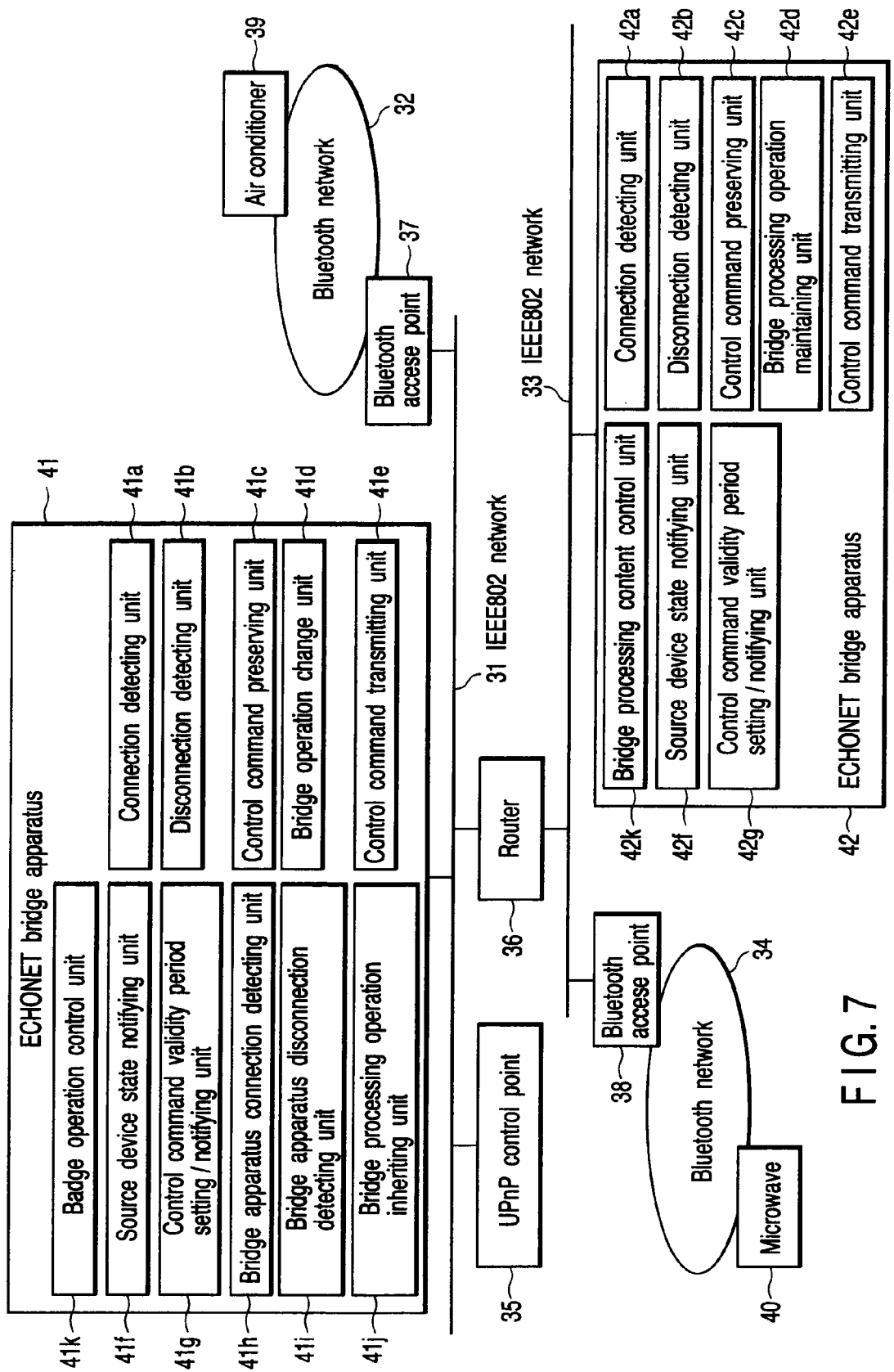
FIG. 7 is a view showing a network according to a second embodiment.

As shown in FIG. 7, an UPnP control point 35 exists over an IEEE802 network 31, and an air conditioner 39 corresponding to an ECHONET protocol is connected to a Bluetooth network 32. In addition, a Bluetooth access point 37 is connected to both of the IEEE802 network 31 and the Bluetooth network 32. On the other hand, a microwave 40 corresponding to the ECHONET protocol is connected to a Bluetooth network 34. In addition, a Bluetooth access points 38 is connected to both of an IEEE802 network 33 and the Bluetooth network 34. A router 36 is interposed between the IEEE802 network 31 and the IEEE802 network 33, and the IEEE802 network is divided into two subnets.

An UPnP control point 35 is connected to the IEEE802 network 31, and then, ECHONET bridge apparatuses 41 and 42 according to a second embodiment are connected to the IEEE802 networks 31 and 33. These ECHONET bridge apparatuses 41 and 42 include: connection detecting units 41a and 42a; disconnection detecting units 41b and 42b; control command preserving units 41c and 42c; bridge operation change units 41d and 42d; control command transmitting units 41e and 42e; source device state notifying units 41f and 42f; control command validity period setting/notifying units 41g and 42g; and bridge operation control units 41k and 42k, respectively.

First, it is assumed that the air conditioner 39 is connected to the Bluetooth network 32 and bridge-processed by means of the ECHONET bridge apparatus 41, and further, the microwave 40 is connected to the Bluetooth network 34 and bridge-processed by means of the ECHONET bridge apparatus 42. At this time, the ECHONET bridge apparatus 40 cannot detect that the microwave 40 exists as ECHONET compatible equipment because the router 36 is interposed. On the other hand, the ECHONET bridge apparatus 41 can detect that the microwave 40 exists as an UPnP device. Similarly, the UPnP control point 35 can detect the presence of the microwave 40 as an UPnP device. This is because the ECHONET protocol is provided as a protocol limited to a single subnet, whereas the UPnP protocol is provided as a protocol available across a plurality of subnets.

Here, if the ECHONET bridge apparatus 42 is disconnected from the IEEE802 network 33, the ECHONET bridge apparatus 41 detects the disconnection of the ECHONET bridge apparatus 42 by means of a bridge apparatus disconnection detecting unit 41i.

The bridge apparatus disconnection detecting unit 41i is achieved by the ECHONET bridge apparatus 41 itself having an UPnP control point function and checking connectivity of an IP level with respect to a transmission source address of an SSDP byebye packet after receiving the SSDP byebye packet transmitted by a virtual UPnP device that corresponds to the microwave 40 at the time of disconnection of the ECHONET bridge apparatus 42, and then, verifying that no connection can be made.

Alternatively, the bridge apparatus disconnection detecting unit 41i is achieved by the ECHONET bridge apparatus 41 itself having an UPnP control point function; generating and storing a list of an UPnP device over the same UPnP network, based on an SSDP alive packet received from an UPnP device; recognizing disconnection of equipment based on a timeout by managing a timeout period of the SSDP alive packet; and making a connectivity check of the above IP level. At this time, it is thought to use a utility program such as Ping for the connectivity check of the IP level.

In addition, as another implementation means of the bridge apparatus disconnection detecting unit 41*i*, there is provided a method for disclosing the ECHONET bridge apparatus 41 itself as an UPnP device over the IEEE802 network. In this case, the UPnP device corresponding to the ECHONET bridge apparatus 41 transmits an SSDP byebye packet, thus making it possible for the ECHONET bridge apparatus 42 to sense the disconnection of the ECHONET bridge apparatus 41. At this time, the fact that the air conditioner 39 has been bridge-processed by means of the ECHONET bridge apparatus 41 can be checked by a match for a transmission source host of the SSDP byebye packets transmitted by the UPnP devices corresponding to the ECHONET bridge apparatus 41 and the air conditioner 39, respectively, so as to include a hard ware address (such as MAC address) of a bridge apparatus in a serial number element included in a device description, and then, the fact that these values are matched.

Subsequently, the ECHONET bridge apparatus 41 generates a virtual UPnP device with respect to the microwave 40 by means of a virtual device inheriting unit 41*j*. The virtual device inheriting unit 41*j* is achieved by acquiring a device description and a service description of the virtual UPnP device, and then, storing the acquired descriptions in the ECHONET bridge apparatus 41 when SSDP alive has been received from the virtual UPnP device related to the microwave 40. By means of this virtual device inheriting unit 41*j*, from the UPnP control point 35 over the IEEE802 network, the microwave 40 is continuously seen as an UPnP device. However, in actuality, the ECHONET bridge apparatus 42 is not connected to the IEEE802 network 33 and the microwave 40 belongs to a subnet other than the ECHONET bridge apparatus 41, thus making it impossible to send cooking recipe information to the microwave 40 via a virtual UPnP device over the ECHONET bridge apparatus 41.

Here, the UPnP control point 35 transmits the cooking recipe data acquired via the Internet to the microwave 40. The ECHONET bridge apparatus 41 receives the cooking recipe data, and then, stores the received data in the bridge apparatus by means of the control command preserving unit 41*c*. When the ECHONET bridge apparatus 42 is connected to the IEEE802 network 33 again, the ECHONET bridge apparatus 42 detects the connection of the microwave 40 by means of the connection detecting unit 42*a*, and then, starts a bridge processing operation. At this time, the ECHONET bridge apparatus 41 detects that the ECHONET bridge apparatus 42 has been connected to the IEEE802 network 33 again by means of a bridge apparatus connection detecting unit 41*h*. This bridge apparatus connection detecting unit 41*h* is achieved by detecting that a virtual UPnP device relevant to the microwave 40 has been generated by means of the connection detecting unit 41*a*; and recognizing that the virtual UPnP device relevant to the microwave 40 generated by its own has been generated by means of the virtual device inheriting unit 41*j*. Subsequently, the ECHONET bridge apparatus 41 transmits from the control command transmitting unit 41*e* the cooking recipe data transmitted from the UPnP control point 35 and stored in the control command preserving unit 41*c*. An outline of the procedures for the above processing operation is shown in a schematic view of FIG. 8.

Figure 8:
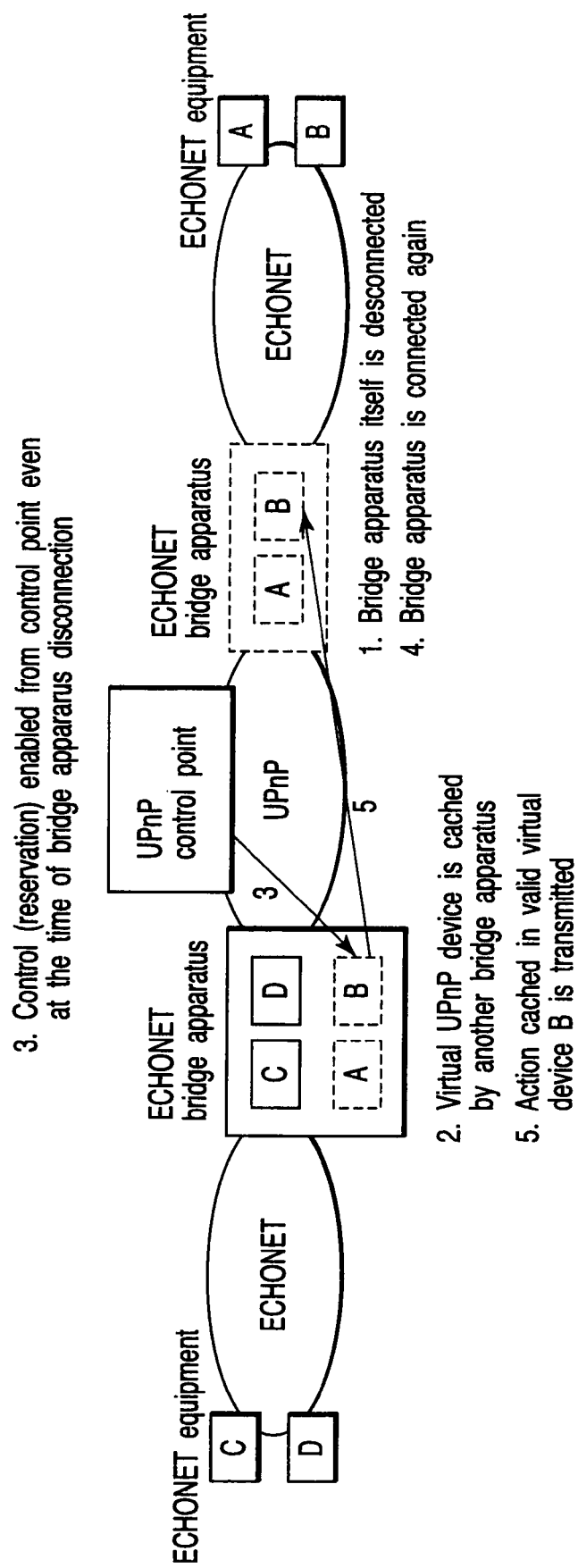
FIG. 8 is a schematic view showing a bridge processing operation according to the second embodiment.

Such processing in FIG. 8 includes operations 1-5 of (1) Bridge apparatus itself is disconnected, (2) Virtual UPnP devices cached by another bridge apparatus, (3) Control reservation enabled from control point even at the time of bridge apparatuses connection, (4) Bridge apparatus is connected again, (5) Action cached in valid virtual device B is transmitted.

Third Embodiment

Figure 9:
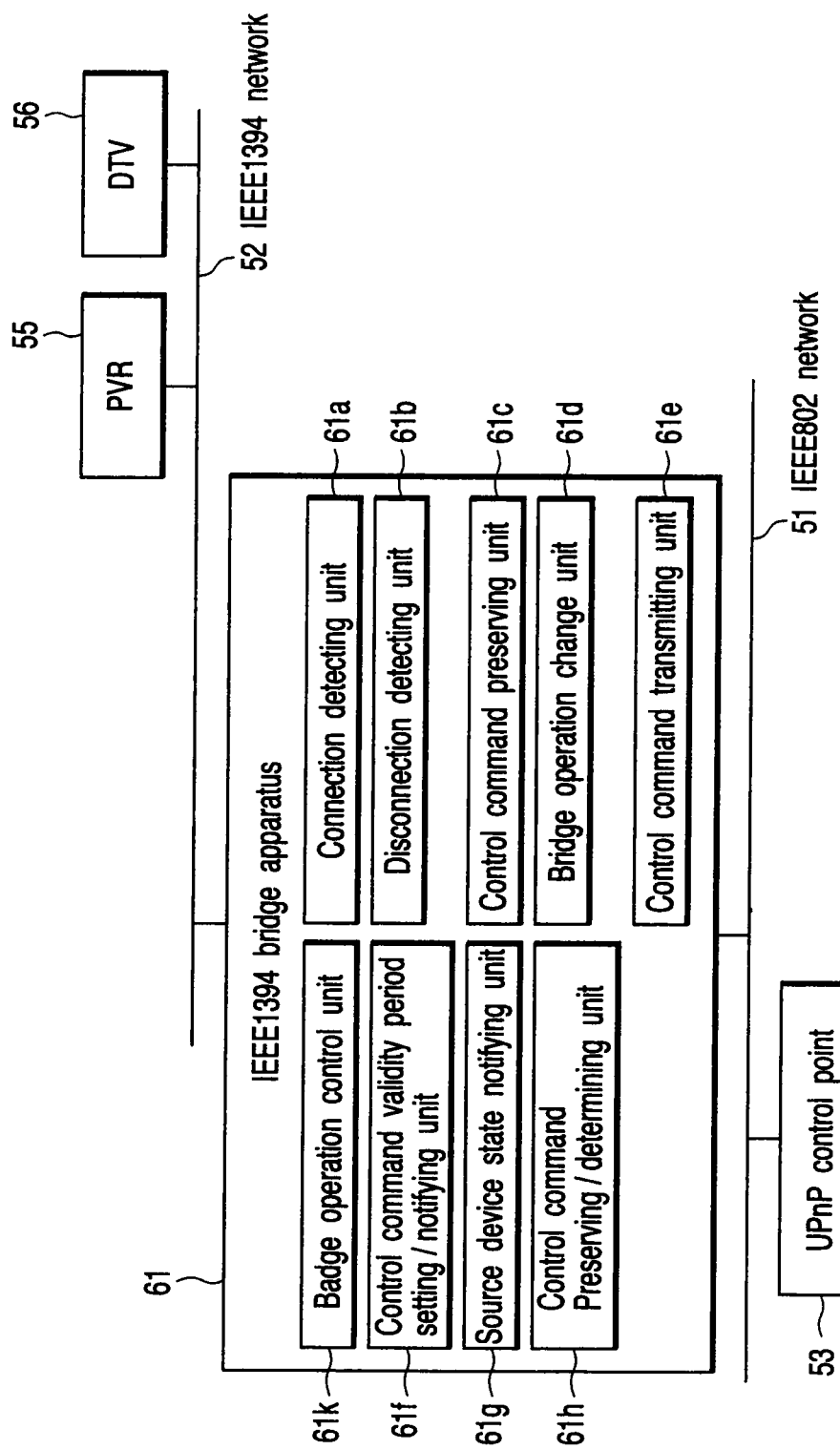
FIG. 9 is a view showing a network according to a third embodiment.

As shown in FIG. 9, an UPnP control point 53 exists over an IEEE802 network 51. In addition, a personal video recorder (PVR) 55 and a digital television (DTV) 56 corresponding to an IEEE1394 protocol are connected over an IEEE1394 network. Further, an IEEE1394 bridge apparatus 61 according to a third embodiment is connected to the IEEE802 network 51. The IEEE1394 bridge apparatus 61 includes: a connection detecting unit 61*a*; a disconnection detecting unit 61*b*; a control command preserving unit 61*c*; a bridge operation change unit 61*d*; a control command transmitting unit 61*e*; a source device state notifying unit 61*g*; a control command validity period setting/notifying unit 61*f*; a control command preserving/determining unit 61*h*; and a bridge operation control unit 61*k*. A mechanism for the IEEE1394 bridge apparatus 61 to detect connection or disconnection of IEEE1394 equipment over an IEEE1394 network 52 is different from that of an ECHONET bridge apparatus, and is achieved by detecting a bus reset that occurs at the time of an IEEE1394 network topology change. With respect to the other points, the mechanism is identical to that of the ECHONET bridge apparatus. In this manner, the present invention can also be applied to an IEEE1394 bridge apparatus capable of operating IEEE1394 equipment in accordance with an UPnP protocol.

With respect to the embodiments described above, their advantageous effects will be described below.

Even if ECHONET equipment is disconnected from a Bluetooth network, and cannot send a control command in accordance with an ECHONET packet, the ECHONET bridge apparatus according to the first embodiment can execute a bridge processing operation continuously. In this manner, the disconnected ECHONET equipment is seen to exist as if it were an UPnP device from an UPnP network. Further, an UPnP control point can transmit a control command to a virtual UPnP device that corresponds to the disconnected ECHONET equipment, the virtual device being generated on the ECHONET bridge apparatus. This control command is transmitted to the ECHONET equipment and is executed when the ECHONET equipment is connected to the Bluetooth network again. Many of the present home electronics equipment is automatically powered down if they are not used for a predetermined period for the purpose of electric power saving. In particular, home electronics having a network function cannot be accessed via a network at the time of this electric power saving. In the ECHONET bridge apparatus that achieves control via an UPnP protocol relevant to such home electronics equipment, it is important that a control command is accepted regardless of a power supply state or a network connection state of source ECHONET equipment.

With the ECHONET bridge apparatus according to the first embodiment, in the case where a control command has been accepted when the source ECHONET equipment is disconnected from the Bluetooth network, if this control command requests acquisition of a permanent parameter that the ECHONET equipment has, the ECHONET bridge apparatus can return a response to this control command instead in a substitutive manner.

In addition, a bridge processing operation is always carried out regardless of a power supply state or a network connection state of the ECHONET apparatus targeted for bridge. Thus, even in the case where the ECHONET equipment is not connected to a network, an UPnP device relevant to the ECHONET equipment appears to exist from the UPnP control point. At this time, in the case where the UPnP control point wants to know whether the ECHONET equipment is actually network reachable or not, the ECHONET bridge apparatus according to the first embodiment can provide information relevant thereto.

In addition, in the case where the UPnP control point wants to know a time when ECHONET equipment is disconnected from the Bluetooth network or a time when it is connected, the ECHONET bridge apparatus according to the first embodiment can provide information relevant thereto.

In addition, a control command for ECHONET equipment disconnected from the Bluetooth network can be preserved until the ECHONET equipment is connected again. In the case where the UPnP control point wants to know or change this preservation time, the ECHONET bridge apparatus according to the first embodiment can provide preservation period information. In addition, the preservation period can be set for the UPnP control point.

With the ECHONET bridge apparatus according to the second embodiment, in the case where a plurality of ECHONET bridge apparatuses exist across a plurality of IP subnets, even if one of the ECHONET bridge apparatuses is disconnected from the network, other ECHONET bridge apparatuses inherit a bridge processing operation. Upon reconnection, a control command accepted during the disconnection is transmitted to the reconnected ECHONET bridge apparatus, thereby making it possible to execute a control command in accordance with an UPnP protocol relevant to the underlying ECHONET equipment even if the bridge apparatus is disconnected from the network.

The present invention can be applied to the IEEE1394 bridge apparatus capable of operating IEEE1394 equipment with an UPnP protocol, as described in the third embodiment. The function and advantageous effect described above apply to the IEEE1394 bridge apparatus as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A bridge apparatus connected between a first network to which first equipment is connected and a second network to which second equipment is connected, the apparatus comprising:
   a connection detecting device configured to detect connection of the second equipment to the second network;
   a management device configured to allocate a virtual device processor to the second equipment in accordance with detection of the connection of the second equipment to the second network, wherein the virtual device processor stores bridge operation attribute information that indicates a response policy for the second equipment or a response policy for attribute values of the second equipment, and makes a bridge operation between the first network and the second network, the attribute values including a variable value and a fixed value, the attribute values indicating properties of the apparatus, the variable value being variable since the apparatus is fabricated, the fixed value being invariable since the apparatus is fabricated;
   a disconnection detecting device configured to detect disconnection of the second equipment from the second network; and
   a bridge operation control device configured to direct the virtual device processor to change contents of the bridge operation in accordance with the bridge operation attribute information, when the disconnection of the second equipment from the second network is detected,
   wherein the virtual device processor comprises an update device configured to update contents of the bridge operation in accordance with the bridge operation attribute information assigned from the bridge operation control device, and
   in response to a request from the first equipment, the update device switches between a first operation and a second operation in accordance with the bridge operation attribute information, the first operation being the update device responds to the request, the second operation being the update device forwards the request to the second equipment.

2. The apparatus according to claim 1, further comprising an acquisition device configured to acquire a validity period of a control command from the first equipment to the second equipment.

3. The apparatus according to claim 1, wherein the bridge operation attribute information further includes specifying a time period for maintaining the bridge processing operation.

4. The apparatus according to claim 1, wherein the bridge operation attribute information indicates any of keeping the bridge processing operation running for a set period, immediate stoppage of the bridge processing operation, and keeping the bridge processing operation permanently.

5. The apparatus according to claim 1, wherein the virtual device processor:
   when a control command from the first equipment intends to make a search for equipment that belongs to the second network, responds to the first equipment the fact that the second equipment exists;
   when the control command intends to acquire attribute information on the second equipment, responds to the first equipment, attribute information on the second equipment that has been acquired in advance; and
   when the control command intends to a request for notifying a state change of the second equipment, responds to the first equipment the fact that a notification request has been accepted and notifying to the first equipment the attribute information as an initial state.

6. The apparatus according to claim 5, wherein the bridge operation attribute information indicates:
   response enable or disable determination information in the case where the control command from the first equipment intends to make a search for equipment that belongs to the second network;
   response enable or disable determination information in the case where the control command from the first equipment intends to acquire equipment information on the equipment that belongs to the second network; and
   response enable or disable determination information in the case where the control command from the first equipment intends to acquire attribute information on the equipment that belongs to the second network.

7. The apparatus according to claim 1, wherein the virtual device processor comprises:
   a determining device configured to determine whether or not to preserve a control command because the virtual device processor cannot process the control command from the first equipment;

a preserving device configured to preserve the control command until the second equipment is connected to the second network again if the control command should be preserved; and
a transmitting device configured to transmit to the second equipment a control command preserved by the preserving device when the second equipment is connected to the second network again; and
wherein the determining device determines whether or not to preserve a control command in accordance with whether one of the attribute values of the second equipment targeted for use in the control command from the first equipment is a variable value or a fixed value.

8. The apparatus according to claim 7, wherein, if one of the attribute values of the second equipment targeted for use in the control command from the first equipment is a variable value, the determining device determines whether to preserve the control command depending on acquisition, setting, and notification requests that correspond to an operation type of the control command.

9. A bridge system comprising:
a first bridge apparatus connected between a first network to which first equipment is connected and a second network to which second equipment is connected; and a second bridge apparatus connected between the first network and a third network, wherein
the first bridge apparatus comprises:
a connection detecting device configured to detect connection of the second equipment to the second network;
a management device configured to allocate a virtual device processor to the second equipment in accordance with detection of the connection of the second equipment to the second network, wherein the virtual device processor stores bridge operation attribute information that indicates a response policy for the second equipment or a response policy for attribute values of the second equipment, and makes a bridge operation between the first network and the second network, the attribute values including a variable value and a fixed value, the attribute values indicating properties of the apparatus, the variable value being variable since the apparatus is fabricated, the fixed value being invariable since the apparatus is fabricated;
a disconnection detecting device configured to detect disconnection of the second equipment from the second network; and
a bridge operation control device configured to direct the virtual device processor to change contents of the bridge operation in accordance with detection of the disconnection of the second equipment from the second network,
and
the second bridge apparatus comprises:
a bridge apparatus disconnection detecting device configured to detect disconnection of the first bridge apparatus from the first network; and
an inheriting device configured to connect to the second network and inherit the bridge operation performed by the virtual device processor of the first bridge apparatus in accordance with the bridge operation attribute information, in a period in which the first bridge apparatus is disconnected from the first network,
wherein the virtual device processor comprises an update device configured to update contents of the bridge operation in accordance with the bridge operation attribute information assigned from the bridge operation control device, and
in response to a request from the first equipment, the update device switches between a first operation and a second operation in accordance with the bridge operation attribute information, the first operation being the update device responds to the request, the second operation being the update device forwards the request to the second equipment.

10. A method for operating a bridge apparatus connected between a first network to which first equipment is connected and a second network to which second equipment is connected, the method comprising:
detecting connection of the second equipment to the second network;
allocating a virtual device processor to the second equipment in accordance with detection of the connection of the second equipment to the second network, wherein the virtual device processor stores bridge operation attribute information that indicates a response policy for the second equipment or a response policy for attribute values of the second equipment, and makes a bridge operation between the first network and the second network, the attribute values including a variable value and a fixed value, the attribute values indicating properties of the apparatus, the variable value being variable since the apparatus is fabricated, the fixed value being invariable since the apparatus is fabricated;
detecting disconnection of the second equipment from the second network; and
directing the virtual device processor to change contents of the bridge operation in accordance with the bridge operation attribute information, when the disconnection of the second equipment from the second network is detected,
wherein the virtual device processor comprises an update device configured to update contents of the bridge operation in accordance with the bridge operation attribute information assigned from the directing, and
in response to a request from the first equipment, the update device switches between a first operation and a second operation in accordance with the bridge operation attribute information the first operation being the update device responds to the request, the second operation being the update device forwards the request to the second equipment.

11. A non-transitory computer readable medium including computer executable instructions which when executed on a computer perform a method for operating a bridge apparatus connected between a first network to which first equipment is connected and a second network to which second equipment is connected, the method comprising:
detecting connection of the second equipment to the second network;
allocating a virtual device processor to the second equipment in accordance with detection of the connection of the second equipment to the second network, wherein the virtual device processor stores bridge operation attribute information that indicates a response policy for the second equipment or a response policy for attribute values of the second equipment, and makes a bridge operation between the first network and the second network, the attribute values including a variable value and a fixed value, the attribute values indicating properties of the apparatus, the variable value being variable since the apparatus is fabricated, the fixed value being invariable since the apparatus is fabricated;
detecting disconnection of the second equipment from the second network; and
directing the virtual device processor to change contents of the bridge operation in accordance with the bridge operation attribute information, when the disconnection of the second equipment from the second network is detected,
wherein the virtual device processor comprises an update device configured to update contents of the bridge operation in accordance with the bridge operation attribute information assigned from the directing, and
in response to a request from the first equipment, the update device switches between a first operation and a second operation in accordance with the bridge operation attribute information, the first operation being the update device responds to the request, the second operation being the update device forwards the request to the second equipment.

* * * * *